United States Patent
Buyuktosunoglu et al.

(10) Patent No.: US 11,321,495 B2
(45) Date of Patent: May 3, 2022

(54) ANOMALOUS CACHE COHERENCE TRANSACTION DETECTION IN A HETEROGENEOUS SYSTEM

(71) Applicant: INTERNATIONAL BUSINESS MACHINES CORPORATION, Armonk, NY (US)

(72) Inventors: Alper Buyuktosunoglu, White Plains, NY (US); Hyojin Sung, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 16/837,793

(22) Filed: Apr. 1, 2020

(65) Prior Publication Data
US 2021/0312093 A1 Oct. 7, 2021

(51) Int. Cl.
| | |
|---|---|
| *G06F 21/79* | (2013.01) |
| *G06F 21/56* | (2013.01) |
| *G06F 12/0817* | (2016.01) |
| *G06F 12/084* | (2016.01) |
| *G06F 12/0811* | (2016.01) |
| *G06F 21/57* | (2013.01) |

(52) U.S. Cl.
CPC .......... *G06F 21/79* (2013.01); *G06F 12/084* (2013.01); *G06F 12/0811* (2013.01); *G06F 12/0828* (2013.01); *G06F 21/566* (2013.01); *G06F 21/577* (2013.01)

(58) Field of Classification Search
CPC ...... G06F 21/79; G06F 21/566; G06F 21/577; G06F 12/0828; G06F 12/084; G06F 12/0811

USPC .......................................................... 726/26
See application file for complete search history.

(56) References Cited

U.S. PATENT DOCUMENTS

| | | | |
|---|---|---|---|
| 9,514,050 B1 * | 12/2016 | Agarwal | G06F 12/0806 |
| 10,410,115 B2 | 9/2019 | Lewis et al. | |
| 10,496,697 B2 | 12/2019 | Das et al. | |
| 10,725,926 B2 * | 7/2020 | Jones | G06F 12/0864 |
| 2002/0133674 A1 * | 9/2002 | Martin | G06F 12/0831 |
| | | | 711/141 |
| 2013/0081100 A1 * | 3/2013 | Sreehari | H04L 63/20 |
| | | | 726/1 |
| 2015/0058570 A1 * | 2/2015 | Wang | G06F 12/0828 |
| | | | 711/122 |
| 2018/0300076 A1 * | 10/2018 | Liu | G06F 3/0659 |
| 2019/0207969 A1 | 7/2019 | Brown | |

(Continued)

OTHER PUBLICATIONS

"A Cache Coherence Mechanism To Forward Clean Lines"; IPCOM000022686D; IPCOM Publication date Mar. 25, 2004; (8 Pages).

(Continued)

*Primary Examiner* — Samson B Lemma
(74) *Attorney, Agent, or Firm* — Griffiths & Seaton PLLC

(57) ABSTRACT

Embodiments for mitigating security vulnerabilities in a heterogeneous computing system are provided. Anomalous cache coherence behavior may be dynamically detected between a host and one or more accelerators using a cache controller at a shared last level cache based upon a pair-based coherence messages functioning as a proxy for indicating one or more security attack protocols.

17 Claims, 9 Drawing Sheets

(56) References Cited

U.S. PATENT DOCUMENTS

2020/0089615 A1* 3/2020 Jones ................ G06F 12/0864
2020/0104265 A1* 4/2020 Berger ............... G06F 12/0811

OTHER PUBLICATIONS

"Method for Latency-Saving Micro-Architecture for Data Return in CPUS With Snoop-Based Cache Coherence and Integrated Memory Controllers"; IPCOM000143981D; IPCOM Publication Date Dec. 13, 2006; (7 Pages).

"Method of Testing Shared Caches/TLB Intervention"; IPCOM000241210D; IPCOM Publication Date Apr. 3, 2015; (6 Pages).

Manovit, C.; "Testing Memory Consistency of Shared-Memory Multiprocessors"; Jun. 2006 (122 Pages).

Yao, F. et al.; "Covert Timing Channels Exploiting Cache Coherence Hardware: Characterization and Defense"; (26 Pages).

Inoue, H.; "Anomaly Detection in Dynamic Execution Environments"; (189 Pages). Dec. 2005.

"Revisiting the Complexity of Hardware Cache Coherence and Some Implications", Komuravelli et al. (ACM Transactions on Architecture and Code Optimization) Dec. 2014 Article #37 (22 Pages).

* cited by examiner

ANOMALOUS CACHE COHERENCE TRANSACTION DETECTION IN A HETEROGENEOUS SYSTEM

GOVERNMENT LICENSE RIGHTS TO CONTRACTOR-OWNED INVENTIONS MADE UNDER FEDERALLY SPONSORED RESEARCH AND DEVELOPMENT

This invention was made with Government support under Contract No. HR-0011-18-C-0122 awarded by Defense Advanced Research Projects Agency (DARPA). The Government has certain rights to this invention.

BACKGROUND OF THE INVENTION

Field of the Invention

The present invention relates in general to computing systems, and more particularly to, various embodiments for anomalous cache coherence transaction detection in a heterogeneous computing system.

Description of the Related Art

A conventional symmetric multiprocessor (SMP) computing system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores. In systems which implement this type of shared cache (such as a level 2 (L2) cache), recent developments have shown that data security vulnerabilities may exist which allow exploitation of various methods in which certain processors execute instructions and store data within the shared cache, potentially allowing unauthorized access to sensitive data contained therein.

SUMMARY OF THE INVENTION

Various embodiments are provided for mitigating security vulnerabilities (e.g., anomalous cache coherence transactions) in a heterogeneous computing system are provided. Anomalous cache coherence behavior may be dynamically detected between a host and one or more accelerators using a cache controller at a shared last level cache based upon a pair-based coherence messages functioning as a proxy for indicating one or more security attack protocols.

In addition to the foregoing exemplary method embodiment, other exemplary system and computer product embodiments are provided and supply related advantages.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
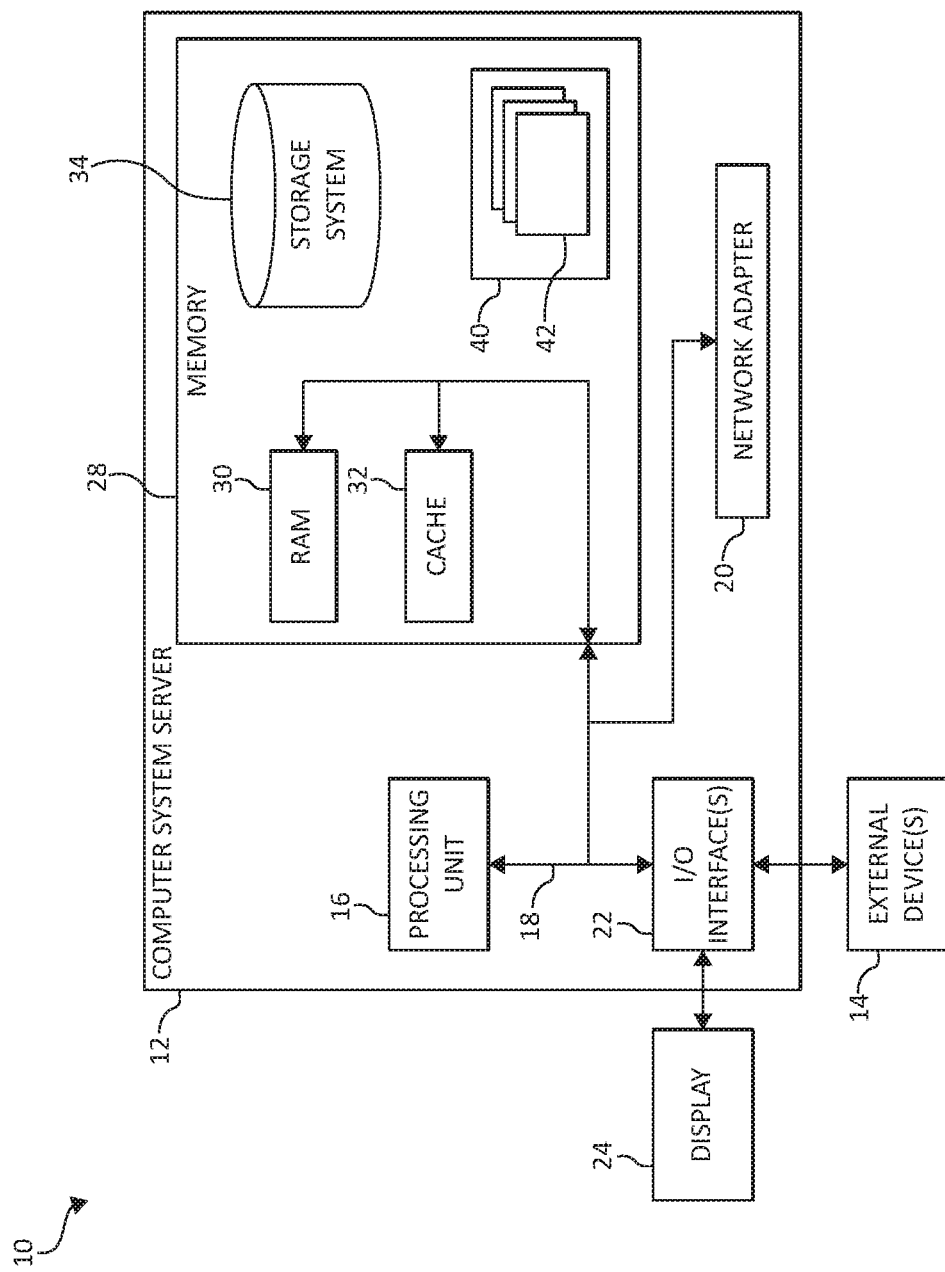
FIG. 1 is a block diagram depicting an exemplary computing node, according to embodiments of the present invention.

Computational demands for emerging workloads such as cognitive computing (i.e., artificial intelligence) have forced the introduction of heterogeneous systems that combine traditional CPUs with throughput-centric compute accelerators. For example, the highly parallel architecture of graphics processors has been adapted for general-purpose highly parallel computing.

Moreover, in contemporary computing environments, modern-day processor architectures (e.g., conventional distributed shared memory computer system, such as a server computer system) may include multiple processing units all coupled to a system interconnect, which typically comprises one or more address, data and control buses. Coupled to the system interconnect may be a system memory, which represents the lowest level of volatile memory in the multiprocessor computer system and generally is accessible for read and write access by all processing units. Thus, in order to reduce access latency to instructions and data residing in the system memory, each processing unit is typically further supported by a respective multi-level cache hierarchy, the lower level(s) of which may be shared by one or more processor cores.

For example, many computer systems employ cache memory to speed data retrieval operations. Cache memory stores copies of data found in frequently used main memory locations. Accessing data from cache memory speeds processing because cache memory can typically be accessed faster than main memory. If requested data is found in cache memory, then it is accessed from cache memory. However, if requested data is not found in cache memory, then the data is first copied into cache memory and then accessed from the cache memory.

Multi-level cache is a structure in which there are multiple cache memories. For example, a computing system may have three levels, i.e., an L1 cache, an L2 cache, and an L3 cache. Typically, in a multi-level cache configuration, L1 is the smallest and with a short access time. If requested data is not found in L1 cache, the system searches the L2 cache, which is usually physically further away than the L1 cache, thus, with a greater access time. In a similar fashion, if the data is not found in the L2 cache, the L3 cache is searched. Main memory is only accessed if the requested data is not in the L1, L2, or L3 caches. There are many different implementations of cache memory. Also, L2 and L3 caches are often referred to as the "last layer" cache. That is, the last layer/last level cache may be shared across multiple processors while higher level caches may be private to a processor.

Because multiple processor cores may request write access to a same memory block (e.g., cache line or sector) and because cached memory blocks that are modified are not immediately synchronized with system memory, the cache hierarchies of multiprocessor computer systems typically implement a cache coherence protocol for the hierarchical cache memories (e.g., three levels, i.e., an L1 cache, an L2 cache, and an L3 cache) to ensure at least a minimum required level of coherence among the various processor core's "views" of the contents of system memory. The minimum required level of coherence is determined by the selected memory consistency model, which defines rules for the apparent ordering and visibility of updates to the shared memory (where the shared memory may or may not be distributed). In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherence protocol typically defines a set of cache states stored in association with cached copies of memory blocks, as well as the events triggering transitions between the cache states and the cache states to which transitions are made. Coherency protocols can generally be classified as directory-based or snoop-based protocols.

To improve performance, a computer such as, for example, heterogeneous computing systems often includes specialized hardware (e.g., accelerators) that are tailored to execute specific tasks (e.g., a graphics processing unit, a compression unit, or a cryptographic unit). Programming for such systems needs to manage data transfer between a host and accelerators. More accelerators support global coherent address space with host at the hardware level, which provides ease-of-programming and communication efficiency.

However, current challenges exist within the heterogeneous computing system. For example, the implementation details for hardware coherence protocols on accelerators is considered a "black box" to the host. In most cases, it is not feasible for the host to formally verify if a coherence protocol on accelerators is correct and benign. Yet, unverified, "buggy," or malicious coherence protocols can compromise the availability and integrity of the entire heterogeneous computing system. Thus, a need exists for a runtime operation component for the computing system that can detect anomalous coherence behaviors by accelerators and protect the rest of the computing system.

Accordingly, to mitigate the detect anomalous coherence behaviors between accelerators and a host (e.g., a host computing system), various embodiments are provided herein for mitigating security vulnerabilities in a heterogeneous computing system. Anomalous cache coherence behavior may be dynamically detected between a host and one or more accelerators using a cache controller at a shared last level cache (e.g., an L2 and/or L3 cache) based upon a pair-based coherence messages functioning as a proxy for indicating one or more security attack protocols.

In an additional aspect, a runtime component, along with the cache controller or an equivalent control layer at the last-level shared cache, may be used to detect anomalous coherence behaviors. For example, the runtime component may identify and/or focus on computing irregularities (e.g., computing "bug") or malicious availability attacks exploiting deadlocks from L1 caches. The runtime component may inspect and/or check coherence communication between the host and the accelerators that are serialized by the shared L2 cache (few data messages are directly exchanged between L1's). The runtime component may establish invariants or a set of allowed messages for a given type of message when it is processed with correct serialization. The runtime component may inspect/check incoming and outgoing coherence messages thus functioning as a proxy to detect any unexpected sequences or pairs of messages (e.g., performing periodical inspections/checks at selected time intervals). Also, when unexpected types of messages are received, the runtime component may 1) indicate/throw an exception (e.g., notify (e.g., sent an interrupt) the host that an exception has happened, which may be received and logged by the host OS. The host OS may keep track of the exceptions and then exclude a potentially malicious accelerator if such exceptions are repeatedly received for a given accelerator), mark participating accelerator(s) as a potential hazard, and/or increase the frequency of inspecting/checking to confirm coherence communication between the host and the accelerators (e.g., confirm the accelerator is anomalous or malicious).

It should be noted that (for deadlock, bug, or an attack) in certain types of L2 cache to L1 cache messages (e.g., "L2-L1 messages) are a proxy for a global view of the L1 cache and L2 cache states for a cache line. Any L1-to-L2 messages that conflict with the global view may be from a bug or malicious attack. Thus, as used herein there may be one or more selected types of cache messages such as, for example, at least two types of L1-to-L2 messages. 1) A first type (Type 1) of cache messages may be core or cache-initiated requests such as, for example, read, write, upgrade, and/or L1 writeback messages. Also, the type 1 cache messages may reach the L2 cache in any coherence state. 2). The second type ("Type 2") of cache messages may be responses to the L2 cache or L1-initiated request messages such as, for example, the write-back ("WB") for data evicted from a higher level cache (e.g., downgrade from modified or exclusive states), exclusive unblock or unblock (e.g., upgrade to shared, exclusive ("E"), or modified ("M") states), and an acknowledgment ("Ack" such as for L2 initiated writeback request), a strong request-response pairing, a message that can read L2 cache only in particular transient state signifying the L2 cache has initiated a corresponding request and waiting for its response, or other L1 cache messages that are not allowed (e.g., transitions undefined).

In one aspect, for deadlock, bug, or an attack such as, for example, illegal messages, pairs of selected types of cache message requests such as, for example, pairs of Type 2 cache message requests, and the allowed response messages may be tracked and checked for any unallowed incoming messages in-between such as, for example, 1) downgrade: forwarding read request from the L2 cache to the current owner L1 cache (E state or M state) expecting "WB Data" as a response message, 2) upgrade: forwarding a write request from L2 to the current owner L1 expecting "Exclusive Unblock" as a response message, 3) an L2 cache writeback: initiating L2 replacement to all sharers or owner of the cache line and expecting "Ack" as a response message. In one aspect, the present invention may track/monitor how state transitions are defined in the cache coherence protocol without checking from the requesting cores (e.g., accelerator cores). Thus, the "WB data", "exclusive unblock", and "Ack" are response messages paired with triggering request messages such as, for example, "downgrade request and WB Data", "upgrade request and exclusive unblock," and "L2 writeback request and Ack".

In an additional aspect, for deadlock, bug, or an attack such as, for example, illegal requestors, even when an allowed cache message arrived, the requesting core identifier ("ID") is checked and analyzed to determine/validate if the allowed cache message comes from a legitimate (e.g., an approved) core such as, for example, incoming L1 cache replacement and incoming L1 cache upgrade.

It should be noted that the for the incoming L1 cache replacement, the requesting core assumes it has an ownership. During a downgrade, upgrade, and L2 writeback, the L2 cache has the information who is the owner (if any) for verifying an approved requesting core. If the requesting core does not match an approved core, the L1 cache replacement message may be identified as coming from previous owner or may be identified as an incorrect/wrong L1 cache replacement message. Thus, by maintaining/keeping a history (e.g., over a selected period of time) of recent owners can assist in mitigating security vulnerabilities in a heterogeneous computing system.

For incoming L1 upgrade messages, a requesting core assumes it has a read-only copy. During a downgrade there cannot be a sharer as there's an owner. That is, a downgrade means an owner gives up its exclusively ownership and writes back its modified data back to the shared LLC. The presence of an owner indicates there are no other read-only copies in the system. Therefore, any messages indicating a sharer is erroneous. During an L2 cache writeback, the L2 cache writeback should match the sharer's list for which L2 writeback is sent out.

In an additional example, the present invention provides various detection tools/components for mitigating security vulnerabilities in a heterogeneous computing system. For example, the present invention provides 1) a first table (cache line address, type 2 request) of dynamically tracked type 2 pairs, 2) a second table of (type 2 request, allowed messages) static filters for allowed transition, 2) a third table of potentially buggy or malicious cores (e.g., a table of cores that may cause a security threat or hazard). That is, the first table may be a dynamic table updated during execution to keep track of active type 2 requests per cache line address. The second table may be a set of static filters for allowed messages keyed by the type of type 2 request. They are connected, but the second table is similar to fixed filters than a table.

Also, the present invention provides a detection component. For example, when a request message initiating the message pair is sent out, the L2 cache puts an entry in the first table (e.g., the table of dynamically tracked type 2 pairs). The check is done periodically. That is, the check is checking for a valid pair of request/response messages and inserting an entry to the table is followed by checking, so an entry is put into the table only periodically. Most of the time a request may bypass the table. For message coming in for the same cache line, a check (e.g., an illegal message detection operation) may be performed to determine if the incoming message is a valid and allowed message using the second table (e.g., the second table of static filters for allowed transition). If the incoming message is not a valid and allowed message based on using the second table, the core may be added as potential hazard (e.g., a security threat and/or buggy or malicious core) to the third table (e.g., the table of cores that may cause a security threat or hazard).

Once the illegal message detection operation populates the third table, an illegal requestor detection operation may be activated. When detected more than a threshold, the core may be flagged and users are notified. That is, the number of illegal request/response detected is more than a threshold and the core may be flagged where it may be assumed that the threshold is hard-coded.

Thus, using the various embodiments described herein, the present invention may identify availability Quality of Service ("QoS") attacks where one or more accelerator cores greedily requests reads or write ownership in a unusual high volume. Thus, for Type 1 L1 cache requests, the L2 cache is unable to check its legitimacy but the present invention may estimate the Type 1 L1 cache requests feasibility. Thus, the present invention may slow down the host and other accelerators due to network congestion.

For malicious attacks, the present invention may use a counter and threshold component to detect the behavior and control the cache coherency message at a shared cache particularly since write messages may impact the performance with invalidation overhead. Also, the present invention may delay processing messages from an accelerator issuing more messages than a threshold in a given time and may do so without impacting performance as messages will be eventually processed Also, the present invention identify availability Quality of Service ("QoS") attacks where too many Type 1 requests are coming in to L2 cache. In one aspect, a candidate core may be added to a malicious core table if a) a previous threshold violation previously occurred/happened for the accelerator core, and/or b) a previous deadlock detection previously occurred/happened for the accelerator core. Since a network is unordered, the present invention may use a count and threshold component to confirm if there is a security attack or threat (e.g., a computer bug or attack).

Also, the present invention identify availability Quality of Service ("QoS") attacks using a general counter and threshold component by logging the number of incoming/outgoing messages from each core. Thus, within a particular or selected timeframe, an accelerator core with messages greater than the selected and/or defined threshold is flagged Other examples of various aspects of the illustrated embodiments, and attendant benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
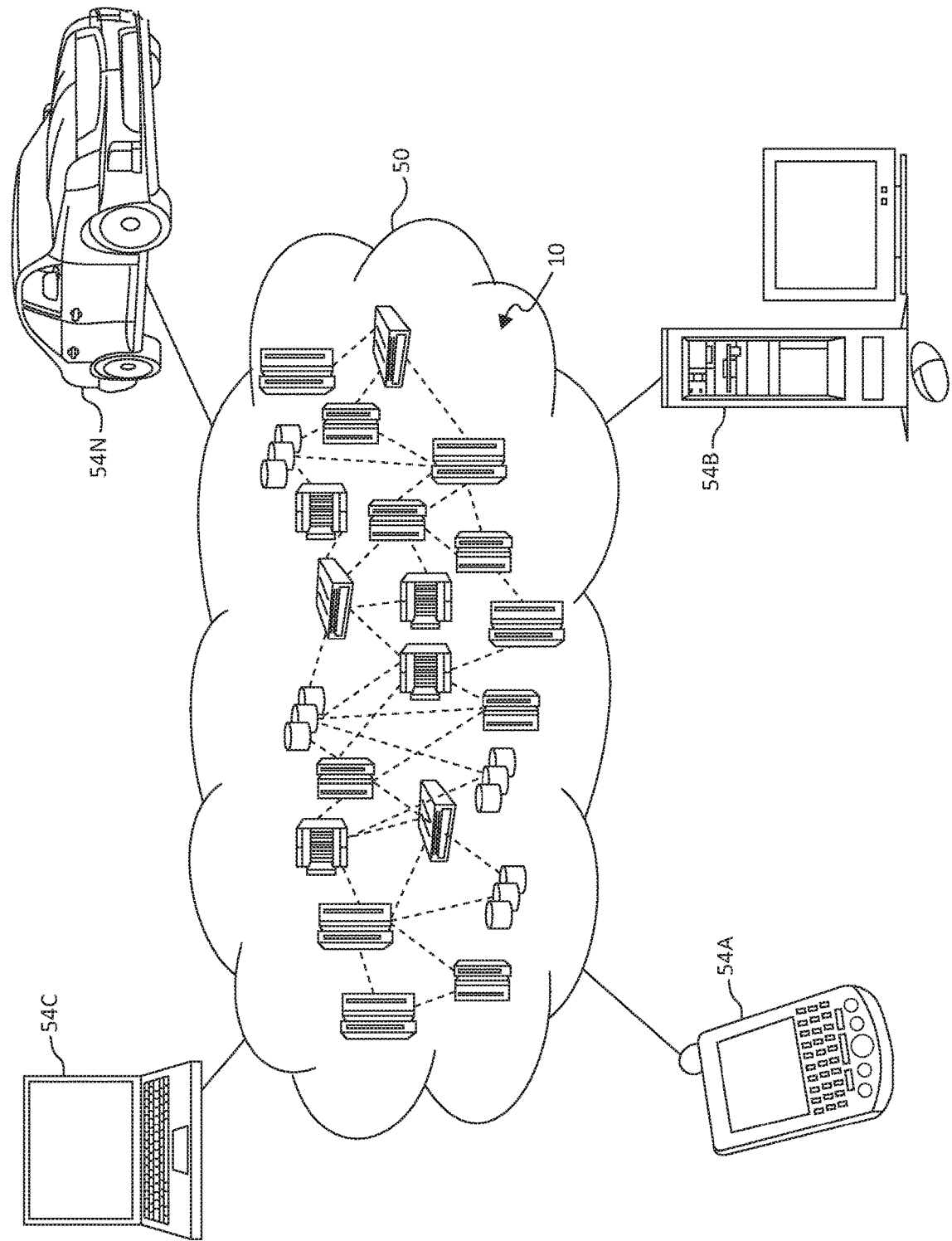
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
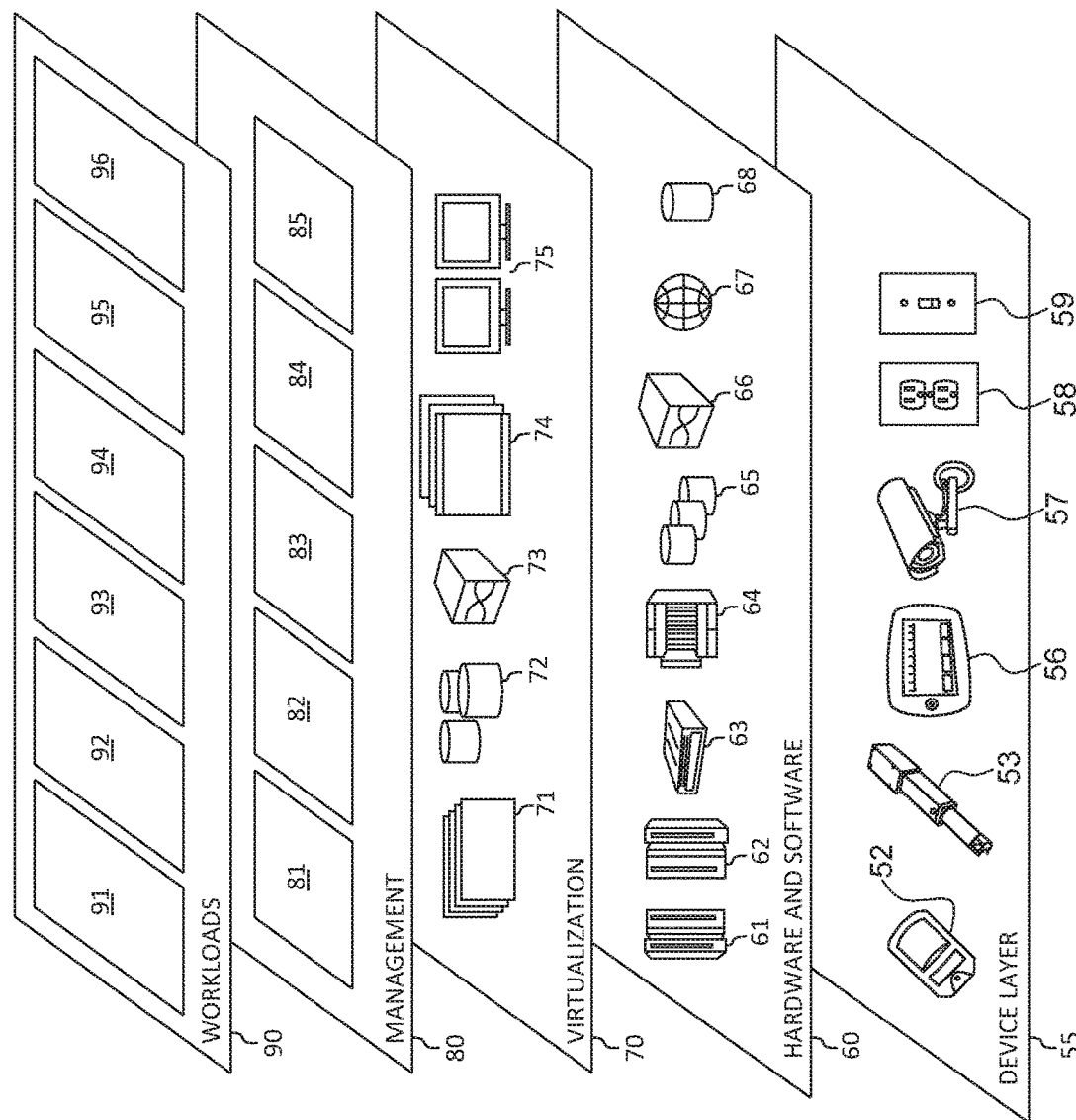
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for anomalous cache coherence detection. In addition, workloads and functions 96 for anomalous cache coherence detection may include such operations as data analytics, data analysis, and as will be further described, detection and comparison functionality. One of ordinary skill in the art will appreciate that the workloads and functions 96 for anomalous cache coherence detection may also work in conjunction with other portions of the various abstractions layers, such as those in hardware and software 60, virtualization 70, management 80, and other workloads 90 (such as, for example, data analytics processing 94, for example) to accomplish the various purposes of the illustrated embodiments of the present invention.

Figure 4:
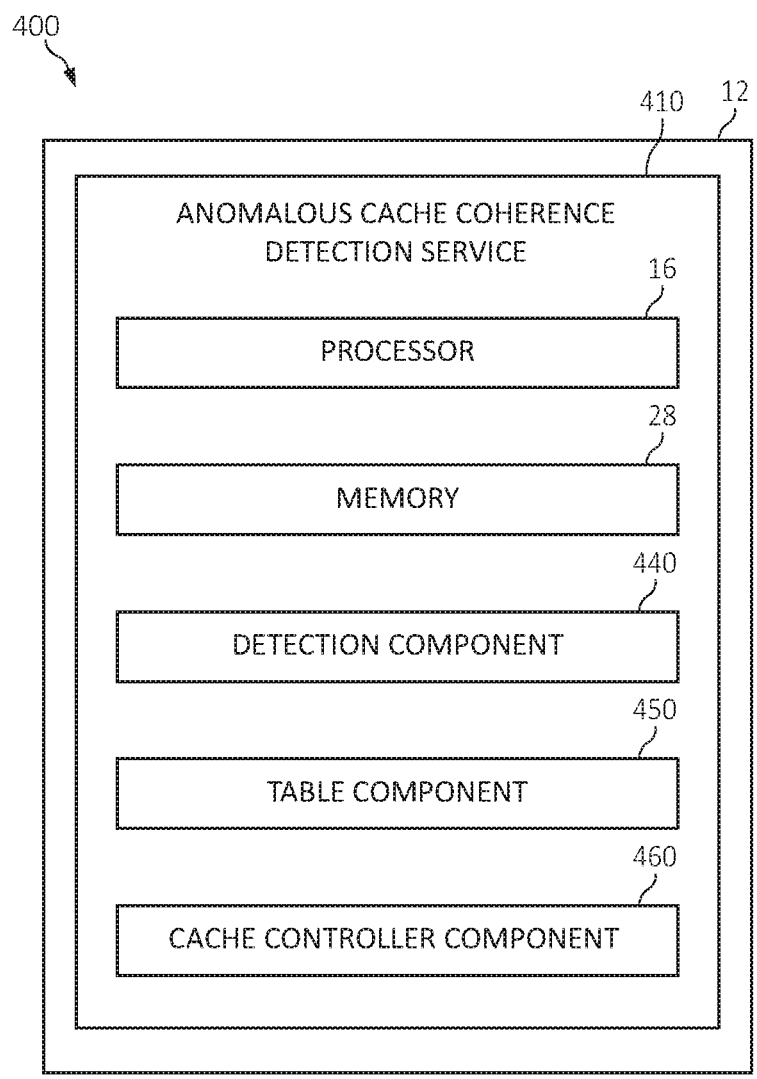
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for mitigating security vulnerabilities in a heterogeneous computing system. In one aspect, one or more of the components, modules, services, applications, and/or functions described in FIGS. 1-3 may be used in FIG. 4. In one aspect, repetitive description of like elements, components, modules, services, applications, and/or functions employed in other embodiments described herein (e.g., FIGS. 1-3) is omitted for sake of brevity.

With the foregoing in mind, the module/component blocks 400 may also be incorporated into various hardware and software components of a system for mitigating security vulnerabilities (e.g., deadlock attack and/or Quality of Service "QoS" attacks) in a heterogeneous computing system in accordance with the present invention. Many of the functional blocks 400 may execute as background processes on various components, either in distributed computing components, or on the user device, or elsewhere.

Computer system/server 12 of FIG. 1 is shown incorporating an anomalous cache coherence detection service 410. The anomalous cache coherence detection service 410 may incorporate processing unit 16 ("processor") and memory 28 of FIG. 1 to perform various computational, data processing and other functionality in accordance with various aspects of the present invention. The anomalous cache coherence detection service 410 may be provided by the computer system/server 12 of FIG. 1.

As one of ordinary skill in the art will appreciate, the depiction of the various functional units in the anomalous cache coherence detection service 410 is for purposes of illustration, as the functional units may be located within the anomalous cache coherence detection service 410 or elsewhere within and/or between distributed computing components.

In one aspect, the computer system/server 12 and/or the anomalous cache coherence detection service 410 may provide virtualized computing services (i.e., virtualized computing, virtualized storage, virtualized networking, etc.). More specifically, the anomalous cache coherence detection service 410 may provide, and/or be included in, a virtualized computing, virtualized storage, virtualized networking and other virtualized services that are executing on a hardware substrate.

The anomalous cache coherence detection service 410 may also function as a cache controller associated with one or more cores (e.g., accelerator cores). In one aspect, anomalous cache coherence detection service 410 may assist in providing access to and/or assist in performing one or more various types of data, services and/or resources for mitigating security vulnerabilities in a heterogeneous computing system. In one aspect, the anomalous cache coherence detection service 410 may provide and/or be associated with a detection component 440, table component 450, a cache controller component 460, and a state transition component 470, each of which may be in communication with each other.

In one aspect, the anomalous cache coherence detection service 410, using one or more of the detection component 440, the table component 450, the cache controller component 460, and/or the state transition component 470, may dynamically detect anomalous cache coherence behavior between a host and one or more accelerators using a cache controller at a shared last level cache based upon a pair-based coherence messages functioning as a proxy for indicating one or more security attack protocols.

For example, consider the following operations by way of example only. In one aspect, the detection component 440 may inspect/compare coherence messages (e.g., pair-based coherence messages) based on a set of allowed responses for a selected type of coherence messages for the pair-based coherence messages. The pair-based coherence messages may include an incoming coherence message and an outgoing coherence message between the host and the one or more accelerators.

The detection component 440 may indicate an exception to the pair-based coherence messages based upon comparing the pair-based coherence messages based on a set of allowed responses for a selected type of coherence messages. The detection component 440 may mark the one or more accelerators as a potential cause of the one or more security attack protocols based upon comparing the pair-based coherence messages based on a set of allowed responses for a selected type of coherence messages. The detection component 440 may increase a frequency over a selected period of time of comparing the pair-based coherence messages based on a set of allowed responses for a selected type of coherence messages for the pair-based coherence messages.

The table component 450 may use a first table (e.g., deadlock detection table) at the cache controller (e.g., the anomalous cache coherence detection service 410 and/or cache controller component 460 functioning as a cache controller) for dynamically tracking the pair-based coherence messages and comparing the pair-based coherence messages based on a set of allowed responses for a selected type of coherence messages for the pair-based coherence messages. The table component 450 may use a second table (e.g., a potentially malicious/buggy core table) at the cache controller (e.g., the anomalous cache coherence detection service 410 and/or cache controller component 460 functioning as a cache controller) for tracking and detecting the one or more accelerators as a potential cause of the one or more security attack protocols.

In one aspect, the table component 450 may update the second table with an identifier of the one or more accelerators upon detecting one or more security attack protocols. Also, the table component 450 may delete an entry from the first table upon completion of a pair-based coherence message transaction.

Figure 5A:
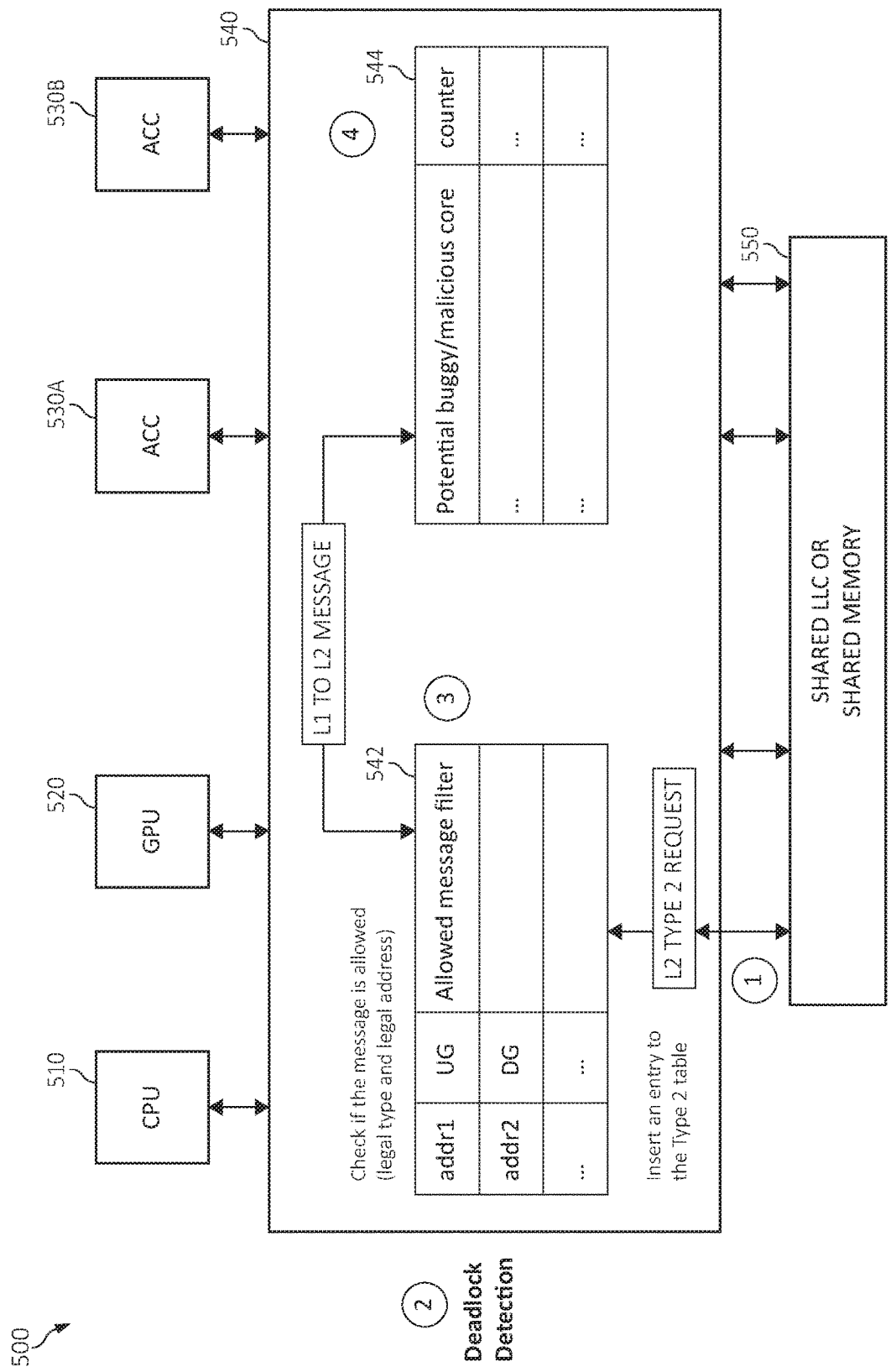
FIG. 5A is an additional block diagram depicting operations for mitigating a deadlock attack in a heterogeneous computing system in accordance with an embodiment of the present invention.
Figure 5B:
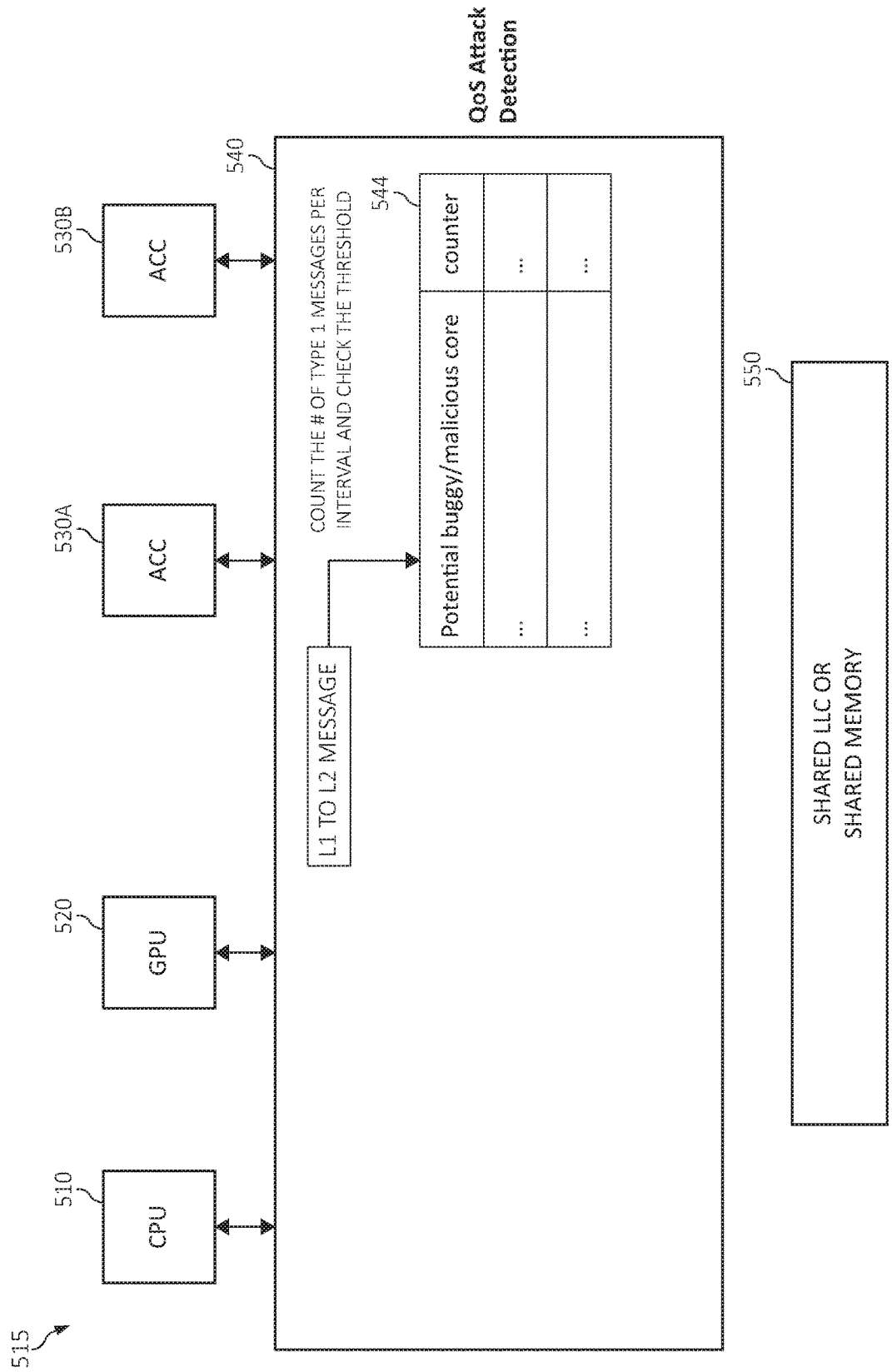
FIG. 5B is an additional block diagram depicting operations for mitigating a Quality of Service ("QoS") attack in a heterogeneous computing system in accordance with an embodiment of the present invention.

Turning now to FIGS. 5A-5B, FIG. 5A is an additional block diagram depicting operations for mitigating a deadlock attack in a heterogeneous computing system and FIG. 5B is an additional block diagram depicting operations for mitigating a Quality of Service ("QoS") attack in a heterogeneous computing system. In one aspect, one or more of the components, modules, services, applications, and/or functions described in FIGS. 1-4 may be used in FIGS. 5A-5B. In one aspect, repetitive description of like elements, components, modules, services, applications, and/or functions employed in other embodiments described herein (e.g., FIGS. 1-3) is omitted for sake of brevity.

As depicted in FIGS. 5A and 5B, a cache controller 540 (which may also function as a detection component) may be in communication with one or more central processor units ("CPU") (e.g., CPU 510), one or more graphics processor unit ("GPU") (e.g., GPU 520), and/or one or more accelerator cores ("ACC") (e.g., ACC 530A and 530B), even of which may be collectively or individually referred to herein as a "core." It should be noted that the computer system/server 12 of FIG. 1 may be employed to execute one or more operations such as, for example, perform various computational, data processing and other functionality in accordance with various aspects of the present invention in FIGS. 5A and 5B. The cache controller 540 (e.g., an anomalous cache coherence detection service 410) may be provided by the computer system/server 12 of FIG. 1.

As shown, the various steps and blocks of functionality are depicted with arrows designating the steps and blocks' 500 and 515 relationships with each other and to show process flow. Additionally, descriptive information is also seen relating each of the functional steps and blocks 500 and 515. As will be seen, many of the functional steps and blocks may also be considered "modules" or "components" of functionality, in the same descriptive sense as has been previously described in FIG. 4. With the foregoing in mind, the module blocks 500 and 515 may also be incorporated into various hardware and software components of a system for image enhancement in accordance with the present invention. Many of the functional blocks 500 and 515 may execute as background processes on various components, either in distributed computing components, or on the user device, or elsewhere.

Turning now to FIG. 5A, starting with step (1), a selected type request (e.g., a type 2 request) is sent out from shared last level cache ("LLC") 550 (or shared memory) onto an interconnect (e.g., the cache controller 540) towards local caches. In step (2), at the cache controller 540, an entry to a first table 542 (e.g., a deadlock detection table) is created and with a line address and the type of type 2 request.

Allowed response message filters may be statically embedded in the cache controller 540 and keyed by the type of type 2 request, which is a static table generated from the coherence protocol that defines a set of response messages allowed for a type-2 request. In step (3), incoming message from local caches (L1) to the interconnect may be periodically checked for the validity of the incoming message from local caches (L1). The period check may be performed by comparing the incoming message from the local caches (L1) with one or more allowed message filters if an entry with the address exists in the first table 542 (e.g., the deadlock detection table) (e.g., check if the messages is allowed where allowable messages is a legal type with a legal address (e.g., as defined and allowed by the coherence protocol design, configuration, and/or implementation). In step (4), if a violation is detected (e.g., the incoming messages is not allowed), a second table 544 (e.g., a security or hazard table or potentially malicious/buggy core table) may be updated with the core ID of the sending core. A counter in the second table 544 may be used to indicate a number of times the core ID of the sending core has been updated in the second table 544. In step (5), when a Type 2 request-response transaction (e.g., the message pair)completes, an entry may be deleted from the first table 542 (e.g., the dead lock detection table).

As depicted in FIG. 5B, the QoS attack may be identified where there are too many Type 1 requests coming in to L2 cache. For example, a candidate core (e.g., CPU 510, GPU 520, ACC 530A, and/or 530B) may be added to a malicious core table if a) a previous threshold violation previously occurred, and/or b) a previous deadlock detection previously occurred. Since a network is unordered, the present invention may use a count and threshold operation to confirm if there is a security attack or threat (e.g., a computer bug or attack) using the second table 544.

Also, the present invention identify availability QoS attack where messages from one or more cores are greater than a selected and/or defined threshold within a particular or selected timeframe. The one or more cores may be flagged in the second table 544. That is, the number of type 1 messages per interval may be counted and the threshold may be checked.

Thus, as depicted in FIGS. 5A and 5B both a pair-based check operation and sequence-based check operation may be performed. For a pair-based check operation, a pair-base check may be performed by checking the types of incoming messages based on a set of allowed responses for type 2 coherence messages. This check is based the assumption that each coherence state the protocol defines state transitions only for a subset of "actions" (messages). A cache line should remain in a certain transient state in the first table 542 when a type 2 request is sent out from the L2 and waiting for a response. Incoming messages of any unallowed types for the same cache line may indicate the message requester (e.g., an "L1") wrongly keeps stale copies or maliciously sends out unrequested messages. Therefore, the present invention defines a set of type 2 messages that allows only a limited set (e.g., a small set such as, for example, two) of strongly coupled response messages and then the allowed responses. Once a type 2 message is sent out, the cache controller 540 may initiate/activate a valid-response checking component for incoming messages for the cache line. The cache controller 540 uses a message filter that lists the messages ID's (e.g., message types that are represented as ID's) for allowed response messages to check the validity of incoming messages.

For a sequence-based check operation, while the pair-based checks are directly based on state transitions of the protocol, the sequence-based checks use additional knowledge as compared to just the states and actions. That is, the sequence-based checks may be performed in an extended version of table 542. Even when an allowed message is received, depending on its originator (e.g., the sending source) or the type (e.g., type 1 or type 2 messages), the sequence-based check operation may indicate a conflicting local view of the cache line as compared to the global view at L2. Cache coherence protocols may merge multiple states into one (or reuse states for other types of messages) assuming all local caches behave as expected by the L2 cache. When it is not the case (e.g., the L2 cache is experiencing unexpected behavior), the present invention may keep track of which cache coherence request caused a current state (usually states implicitly have that information, but not in all cases) and check if incoming messages are valid and expected. It may also require checking the requester's identity. Additional information tracking may be required, but this check can identify more subtle and undetected errors or attacks than pair-based checks. In one aspect, the additional information may be information on more than two messages (a pair) in a sequence, considered together with messages for a related address, etc., for keeping track of a longer sequence of messages than just a pair.

Figure 6:
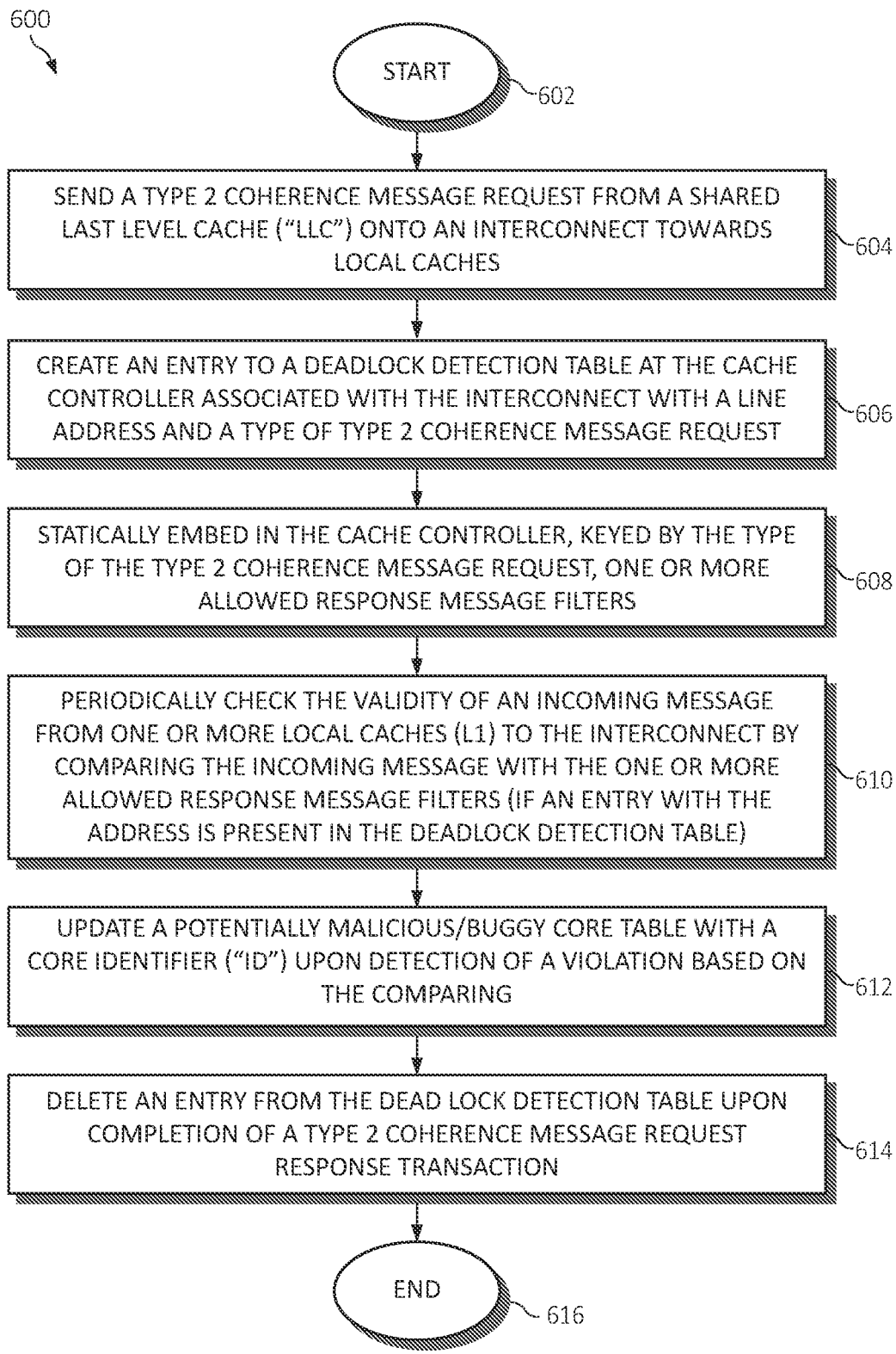
FIG. 6 is a flowchart diagram depicting a method for mitigating security vulnerabilities in a heterogeneous computing system in accordance with an embodiment of the present invention.

Turning now to FIG. 6, a method 600 for mitigating security vulnerabilities in a heterogeneous computing system by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A selected type of coherence message request (e.g., a type 2 coherence message request) may be sent from a shared last level cache ("LLC") onto an interconnect (e.g., interconnect network between cores, caches, and memory) towards local caches, as in block 604. An entry may be created in first table (e.g., a deadlock detection table) at the cache controller associated with the interconnect with a line address and a type of type 2 coherence message request, as in block 606. One or more allowed response message filters may be statically embedded in the cache controller, keyed by a type of the type 2 coherence message request, as in block 608. The validity of an incoming message may be periodically checked from one or more local caches (L1) to the interconnect by comparing the incoming message with the one or more allowed response message filters (if there is an entry with the address is present in the deadlock detection table), as in block 610. A second table (e.g., a potentially malicious/buggy core table) may be updated with a core identifier ("ID") upon detection of a violation based on the comparing, as in block 612. An entry from the first table (e.g., the dead lock detection table) may be deleted upon completion of a selected type of coherence message request response transaction (e.g., a type 2 coherence message request response transaction, as in block 614. The functionality 600 may end, as in block 616.

Figure 7:
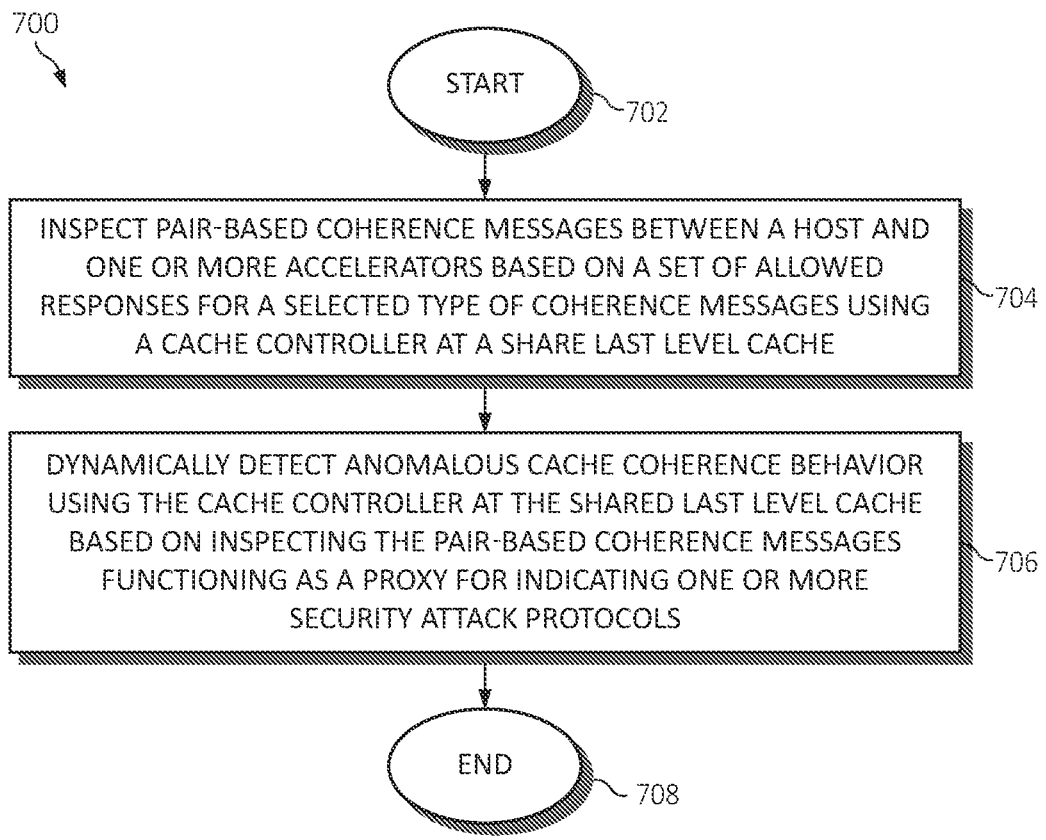
FIG. 7 is an additional flowchart diagram depicting a method for mitigating security vulnerabilities in a heterogeneous computing system in accordance with an embodiment of the present invention.

Turning now to FIG. 7, an additional method 700 for mitigating security vulnerabilities in a heterogeneous computing system by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

Pair-based coherence messages (e.g., incoming and outgoing coherence messages) between a host and one or more accelerators may be inspected (or compared) based on a set of allowed responses for a selected type of coherence messages using a cache controller at a share last level cache, as in block 704. Anomalous cache coherence behavior may be dynamically detected using the cache controller at the shared last level cache based on inspecting the pair-based coherence messages functioning as a proxy for indicating one or more security attack protocols (e.g., deadlock attack protocols/behavior and/or quality of service "QoS" protocols/behavior), as in block 706. The functionality 700 may end, as in block 708.

Figure 8:
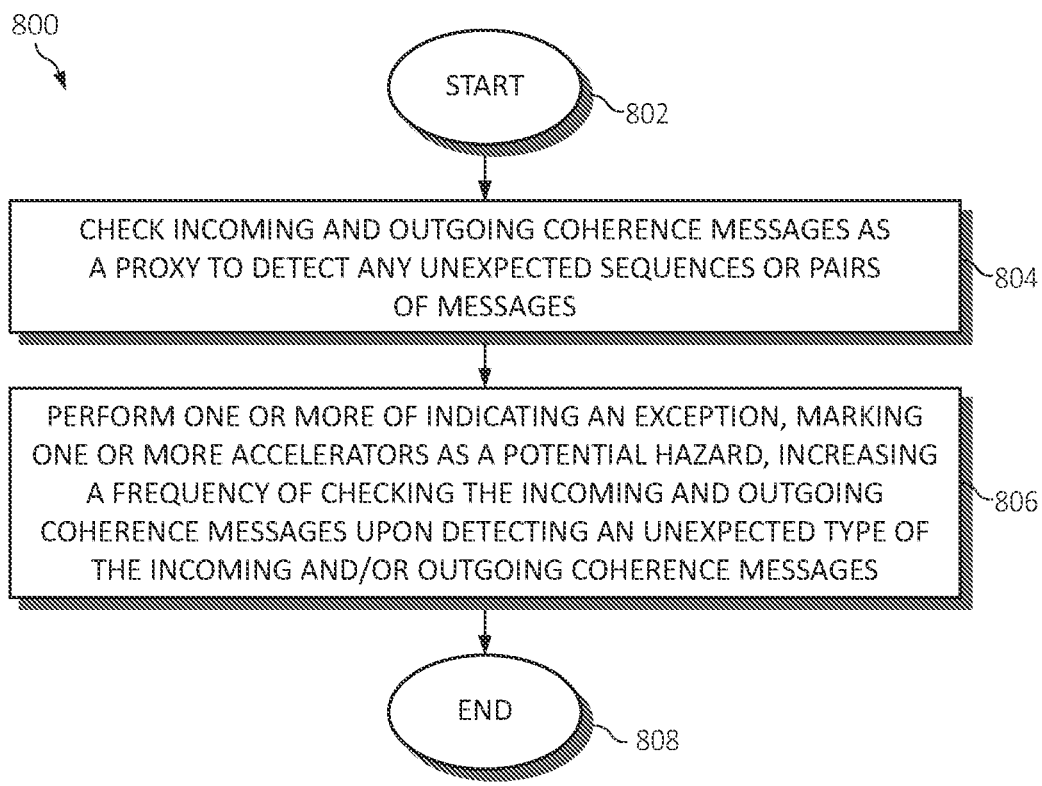
FIG. 8 is an additional flowchart diagram depicting a method for mitigating security vulnerabilities in a heterogeneous computing system in accordance with an embodiment of the present invention.

Turning now to FIG. 8, an additional method 800 for mitigating security vulnerabilities in a heterogeneous computing system by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

Incoming coherence messages and outgoing coherence messages may be checked (e.g., analyzed) as a proxy to detect any unexpected sequences or pairs of messages, as in block 804. One or more operations of indicating an exception, marking one or more accelerators as a potential hazard, increasing a frequency of checking the incoming and outgoing coherence messages upon detecting an unexpected type of the incoming and/or outgoing coherence messages may be performed, as in block 806. The functionality 800 may end, as in block 808.

In one aspect, in conjunction with and/or as part of at least one block of FIGS. 6-8, the operations of methods 600, 700, and/or 800 may include each of the following. The operations of methods 600, 700, and/or 800 may dynamically detect anomalous cache coherence behavior between a host and one or more accelerators using a cache controller at a shared last level cache based upon a pair-based coherence messages functioning as a proxy for indicating one or more security attack protocols.

The operations of methods 600, 700, and/or 800 may compare the pair-based coherence messages based on a set of allowed responses for a selected type of coherence messages for the pair-based coherence messages, wherein the pair-based coherence messages include an incoming coherence message and an outgoing coherence message between the host and the one or more accelerators.

The operations of methods 600, 700, and/or 800 may 1) indicate an exception to the pair-based coherence messages based upon comparing the pair-based coherence messages based on a set of allowed responses for a selected type of coherence messages, 2) mark the one or more accelerators as a potential cause of the one or more security attack protocols based upon comparing the pair-based coherence messages based on a set of allowed responses for a selected type of coherence messages, and/or 3) increase a frequency over a selected period of time of comparing the pair-based coherence messages based on a set of allowed responses for a selected type of coherence messages for the pair-based coherence messages.

The operations of methods 600, 700, and/or 800 may use a first table at the cache controller for dynamically tracking the pair-based coherence messages and comparing the pair-based coherence messages based on a set of allowed responses for a selected type of coherence messages for the pair-based coherence messages and use a second table at the cache controller for tracking and detecting the one or more accelerators as a potential cause of the one or more security attack protocols.

The operations of methods 600, 700, and/or 800 may update the second table with an identifier of the one or more accelerators upon detecting one or more security attack protocols and/or delete an entry from the first table upon completion of a pair-based coherence message transaction.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for mitigating security vulnerabilities in a heterogeneous computing system, by a processor, comprising:
dynamically detecting anomalous cache coherence behavior between a host and one or more accelerators using a cache controller at a shared last level cache based upon a pair-based coherence messages functioning as a proxy for indicating one or more security attack protocols; wherein dynamically detecting the anomalous cache coherence behavior includes:
using a first table at the cache controller for dynamically tracking the pair-based coherence messages and comparing the pair-based coherence messages based on a set of allowed responses for a selected type of coherence messages for the pair-based coherence messages;
using a second table at the cache controller for tracking and detecting the one or more accelerators as a potential cause of the one or more security attack protocols;
updates the second table with an identifier of the one or more accelerators upon detecting one or more security attack protocols; and
deleting an entry from the first table upon completion of a pair-based coherence message transaction.

2. The method of claim 1, further including comparing the pair-based coherence messages based on a set of allowed responses for a selected type of coherence messages for the pair-based coherence messages, wherein the pair-based coherence messages include an incoming coherence message and an outgoing coherence message between the host and the one or more accelerators.

3. The method of claim 1, further including indicating an exception to the pair-based coherence messages based upon comparing the pair-based coherence messages based on a set of allowed responses for a selected type of coherence messages.

4. The method of claim 1, further including marking the one or more accelerators as a potential cause of the one or more security attack protocols based upon comparing the pair-based coherence messages based on a set of allowed responses for a selected type of coherence messages.

5. The method of claim 1, further including increasing a frequency over a selected period of time of comparing the pair-based coherence messages based on a set of allowed responses for a selected type of coherence messages for the pair-based coherence messages.

6. The method of claim 1, further including
updating the second table with an identifier of the one or more accelerators upon detecting one or more security attack protocols.

7. A system for mitigating security vulnerabilities in a heterogeneous computing system, the system comprising:
one or more computers with executable instructions that when executed cause the system to:
dynamically detect anomalous cache coherence behavior between a host and one or more accelerators using a cache controller at a shared last level cache based upon a pair-based coherence messages functioning as a proxy for indicating one or more security attack protocols; wherein dynamically detecting the anomalous cache coherence behavior includes:
using a first table at the cache controller for dynamically tracking the pair-based coherence messages and comparing the pair-based coherence messages based on a set of allowed responses for a selected type of coherence messages for the pair-based coherence messages;
using a second table at the cache controller for tracking and detecting the one or more accelerators as a potential cause of the one or more security attack protocols;
updates the second table with an identifier of the one or more accelerators upon detecting one or more security attack protocols; and
deleting an entry from the first table upon completion of a pair-based coherence message transaction.

8. The system of claim 7, wherein the executable instructions compare the pair-based coherence messages based on a set of allowed responses for a selected type of coherence messages for the pair-based coherence messages, wherein the pair-based coherence messages include an incoming coherence message and an outgoing coherence message between the host and the one or more accelerators.

9. The system of claim 7, wherein the executable instructions indicate an exception to the pair-based coherence messages based upon comparing the pair-based coherence messages based on a set of allowed responses for a selected type of coherence messages.

10. The system of claim 7, wherein the executable instructions mark the one or more accelerators as a potential cause of the one or more security attack protocols based upon comparing the pair-based coherence messages based on a set of allowed responses for a selected type of coherence messages.

11. The system of claim 7, wherein the executable instructions increase a frequency over a selected period of time of comparing the pair-based coherence messages based on a set of allowed responses for a selected type of coherence messages for the pair-based coherence messages.

12. The system of claim 7, wherein the executable instructions
update the second table with an identifier of the one or more accelerators upon detecting one or more security attack protocols.

13. A computer program product for mitigating security vulnerabilities in a heterogeneous computing system, by a processor, the computer program product embodied on a non-transitory computer-readable storage medium having computer-readable program code portions stored therein, the computer-readable program code portions comprising:
an executable portion that dynamically detects anomalous cache coherence behavior between a host and one or more accelerators using a cache controller at a shared last level cache based upon a pair-based coherence messages functioning as a proxy for indicating one or more security attack protocols; wherein dynamically detecting the anomalous cache coherence behavior includes:
using a first table at the cache controller for dynamically tracking the pair-based coherence messages and comparing the pair-based coherence messages based on a set of allowed responses for a selected type of coherence messages for the pair-based coherence messages;
using a second table at the cache controller for tracking and detecting the one or more accelerators as a potential cause of the one or more security attack protocols;
updates the second table with an identifier of the one or more accelerators upon detecting one or more security attack protocols; and
deleting an entry from the first table upon completion of a pair-based coherence message transaction.

14. The computer program product of claim 13, further including an executable portion that compares the pair-based coherence messages based on a set of allowed responses for a selected type of coherence messages for the pair-based coherence messages, wherein the pair-based coherence messages include an incoming coherence message and an outgoing coherence message between the host and the one or more accelerators.

15. The computer program product of claim 13, further including an executable portion that indicates an exception to the pair-based coherence messages based upon comparing the pair-based coherence messages based on a set of allowed responses for a selected type of coherence messages.

16. The computer program product of claim 13, further including an executable portion that:
marks the one or more accelerators as a potential cause of the one or more security attack protocols based upon comparing the pair-based coherence messages based on a set of allowed responses for a selected type of coherence messages.

17. The computer program product of claim 13, further including an executable portion that increases a frequency over a selected period of time of comparing the pair-based coherence messages based on a set of allowed responses for a selected type of coherence messages for the pair-based coherence messages.

* * * * *